(12) United States Patent
Chamua et al.

(10) Patent No.: US 12,197,524 B2
(45) Date of Patent: Jan. 14, 2025

(54) MULTI-LEVEL RICH AUTOSUGGESTIONS FOR MULTI-INTENT SEARCH QUERY

(71) Applicant: Microsoft Technology Licensing, LLC, Redmond, WA (US)

(72) Inventors: Kishor Chamua, Hyderabad (IN); Shveta Verma, Hyderabad (IN); Saksham Saxena, Noida (IN); Sushil Kumar Chordia, Hyderabad (IN); Biju Venugopal, Hyderabad (IN); Puneet Agrawal, Jaipur (IN); Karthik Rg, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/122,667

(22) Filed: Mar. 16, 2023

(65) Prior Publication Data
US 2024/0311437 A1   Sep. 19, 2024

(51) Int. Cl.
G06F 16/00 (2019.01)
G06F 16/9532 (2019.01)
G06F 16/9538 (2019.01)
G06F 16/954 (2019.01)

(52) U.S. Cl.
CPC ........ G06F 16/954 (2019.01); G06F 16/9532 (2019.01); G06F 16/9538 (2019.01)

(58) Field of Classification Search
CPC ........ G06F 40/30; G06F 16/22; G06F 16/243; G06F 16/24578; G06F 16/288;
(Continued)

(56) References Cited

U.S. PATENT DOCUMENTS 8,631,004 B2   1/2014   Mishne et al.
9,547,420 B1   1/2017   Cassidy et al.
(Continued)

OTHER PUBLICATIONS

"Create an autocomplete search experience with InstantSearch.js", Retrieved From: https://www.algolia.com/doc/guides/building-search-ui/ui-and-ux-patterns/autocomplete/js/, Jan. 27, 2023, 3 Pages.
(Continued)

*Primary Examiner* — Shyue Jiunn Hwa
(74) *Attorney, Agent, or Firm* — Schwegman Lundberg & Woessner, P.A.

(57) ABSTRACT

Systems and methods are directed to providing multi-level rich autosuggestions for multi-intent search queries. The system receives a query prefix entered in a search box and accesses a database of machine-learning derived intent clusters. Based on the query prefix, a top-ranking machine-learning derived intent cluster is identified, and the search user interface is updated to provide a plurality of first level autosuggestions in an autosuggestion box including a smart suggestion. The smart suggestion is a first level suggestion of the top-ranking machine-learning derived intent cluster. The system receives a selection of the smart suggestion and, in response, replaces the plurality of first level autosuggestions in the autosuggestion box with second level autosuggestions. The second level autosuggestions comprise one or more intent categories that are subsets of the smart suggestion, whereby each intent category comprises a plurality of subcategory suggestions.

20 Claims, 15 Drawing Sheets

(58) Field of Classification Search
CPC .............. G06F 16/316; G06F 16/535; G06F 16/90335; G06F 16/9035; G06F 16/9038; G06F 16/904; G06F 16/906; G06F 16/951; G06F 40/103; G06F 40/205; G06F 16/2428; G06F 16/2457; G06F 16/248; G06F 16/3322; G06F 16/3334; G06F 16/433; G06F 16/434; G06F 16/436; G06F 40/40; G06F 8/65; G06F 8/658; G06F 16/217; G06F 16/2465; G06F 16/285; G06F 16/313; G06F 16/3326; G06F 16/3328; G06F 16/335; G06F 16/345; G06F 16/355; G06F 16/38; G06F 18/214; G06F 18/2411; G06F 18/24317; G06F 30/13; G06F 40/211; G06F 40/279; H04L 41/0869; H04L 43/0817; G06Q 10/06393

See application file for complete search history.

(56) References Cited

U.S. PATENT DOCUMENTS

| | | | |
|---|---|---|---|
| 9,576,074 B2 | 2/2017 | Kuo | |
| 9,619,582 B1 | 4/2017 | Djabarov et al. | |
| 11,016,964 B1* | 5/2021 | Hinegardner | ....... G06F 16/2428 |
| 11,048,734 B1 | 6/2021 | Harris et al. | |
| 11,232,153 B2 | 1/2022 | Alonso et al. | |
| 2015/0278358 A1* | 10/2015 | Abib | ................... G06F 16/9535 707/706 |
| 2017/0091343 A1 | 3/2017 | Shorina et al. | |
| 2019/0114347 A1 | 4/2019 | Johansen et al. | |
| 2022/0147903 A1* | 5/2022 | Yoshikawa | ........ G06Q 10/1053 |

OTHER PUBLICATIONS

Polonioli, et al., "Improve Ecommerce Site Search With Intelligent Query Suggestions", Retrieved From: https://www.coveo.com/blog/improve-ecommerce-site-search-query-suggestions/, Jul. 2, 2020, 13 Pages.

Sobolev, Dmitry, "Smart autocomplete best practices: improve search relevance and sales", Retrieved From: https://blog.griddynamics.com/smart-autocomplete-best-practices/, Apr. 11, 2019, 24 Pages.

Sullivan, Danny, "How Google autocomplete works in Search", Retrieved From: https://blog.google/products/search/how-google-autocomplete-works-search/, Apr. 20, 2018, 7 Pages.

International Search Report and Written Opinion received for PCT Application No. PCT/US2024/018755, Jun. 21, 2024, 14 pages.

* cited by examiner

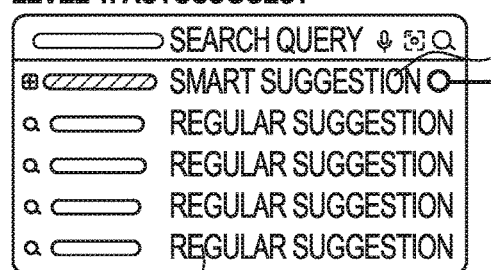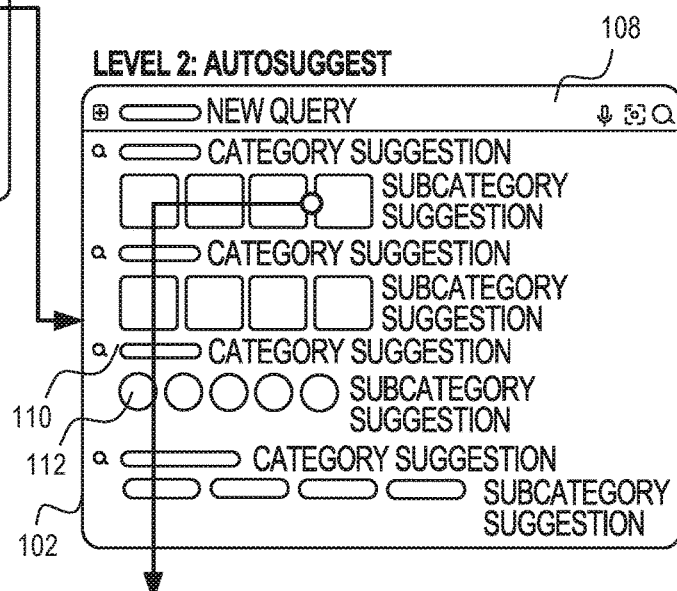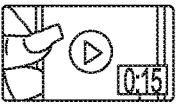
FIG. 1A

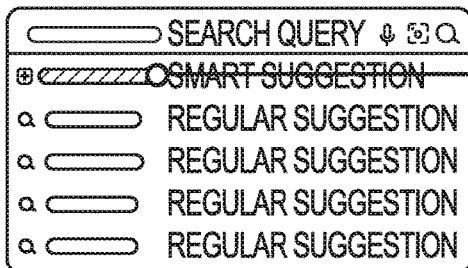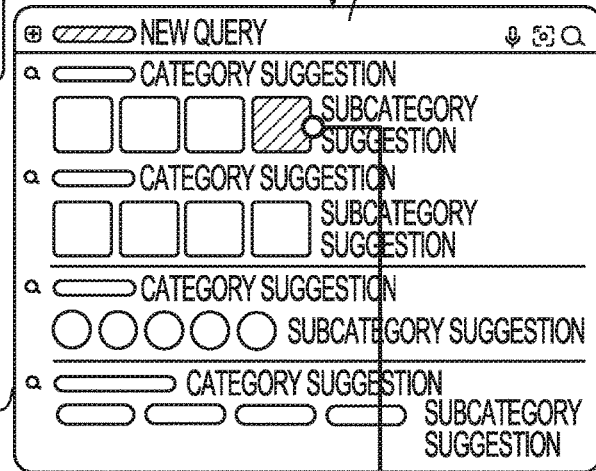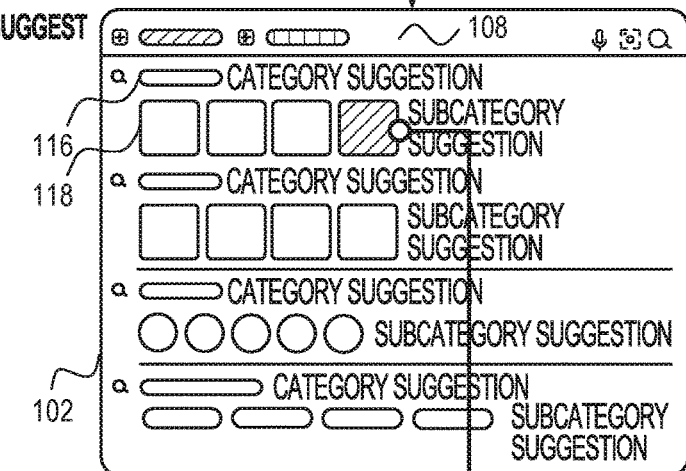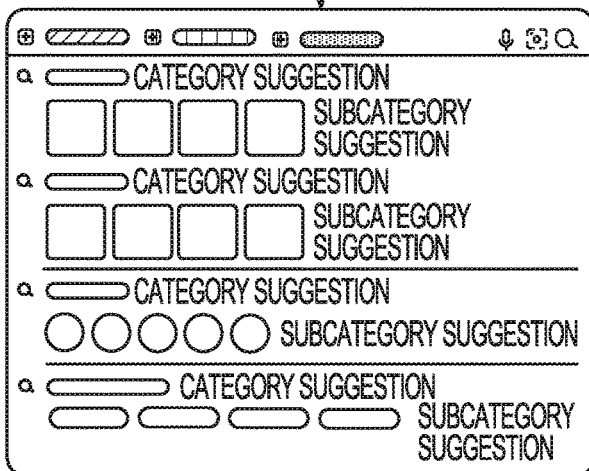
FIG. 1B

1006

ELLIE GOULDING ~ 1002  🎤 📷 🔍

🔍 ELLIE GOULDING EVENTS

| SEP 14 TUE | ZURICH HALLENSTADION 7:00PM | OCT 22 TUE | LONDON HALLENSTADION 7:00PM | NOV 15 TUE | ZURICH HALLENSTADION 7:00PM |

🔍 ELLIE GOULDING ALBUMS AND TITLES

| TOP SONGS | HALCYON 2012 | LIGHTS 2010 | DELIRIUM 2015 | HALCYON DAYS 2013 | RUN INTO THE LIGHT - 2010 |

🔍 ELLIE GOULDING SONGS

| LOVE ME LIKE YOU DO | 4:13 |
|---|---|
| I NEED YOUR LOVE | 3:55 |
| STILL FALLING FOR YOU | 4:00 |

| SOMETHING IN THE WAY | 3:47 |
|---|---|
| FIRST TIME | 3:13 |
| LOVE ME LIKE YOU DO | 4:13 |

🔍 ELLIE GOULDING AWARDS ( GRAMMY AWARDS )  ( BILLBOARD MUSIC AWARDS )  ( MTV VIDEO MUSIC AWARDS )

( BRIT AWARDS )

MULTI-LEVEL RICH AUTOSUGGESTIONS FOR MULTI-INTENT SEARCH QUERY

TECHNICAL FIELD

The subject matter disclosed herein generally relates to search engines. Specifically, the present disclosure addresses systems and methods that determine and presents multi-level rich autosuggestions for multi-intent search queries.

BACKGROUND

Conventionally, an autosuggestion pane or box in search engines provides suggestions based on what the user has typed. The autosuggestion pane presently surfaces suggestions in textual format, where a relevance to a search query negatively correlates to the distance of a click target. Thus, it tends to take several reformulations for a user who wants to explore a topic, is looking for a specific result, or is unable to paraphrase the exact words.

BRIEF DESCRIPTION OF THE DRAWINGS

Some embodiments are illustrated by way of example and not limitation in the figures of the accompanying drawings.

FIG. 1A and FIG. 1B are illustrations of different levels of autosuggestions, according to some example embodiments.

FIG. 10 is a further example screenshot illustrating a search box and autosuggestions in an autosuggestion box.

DETAILED DESCRIPTION

Figure 2:
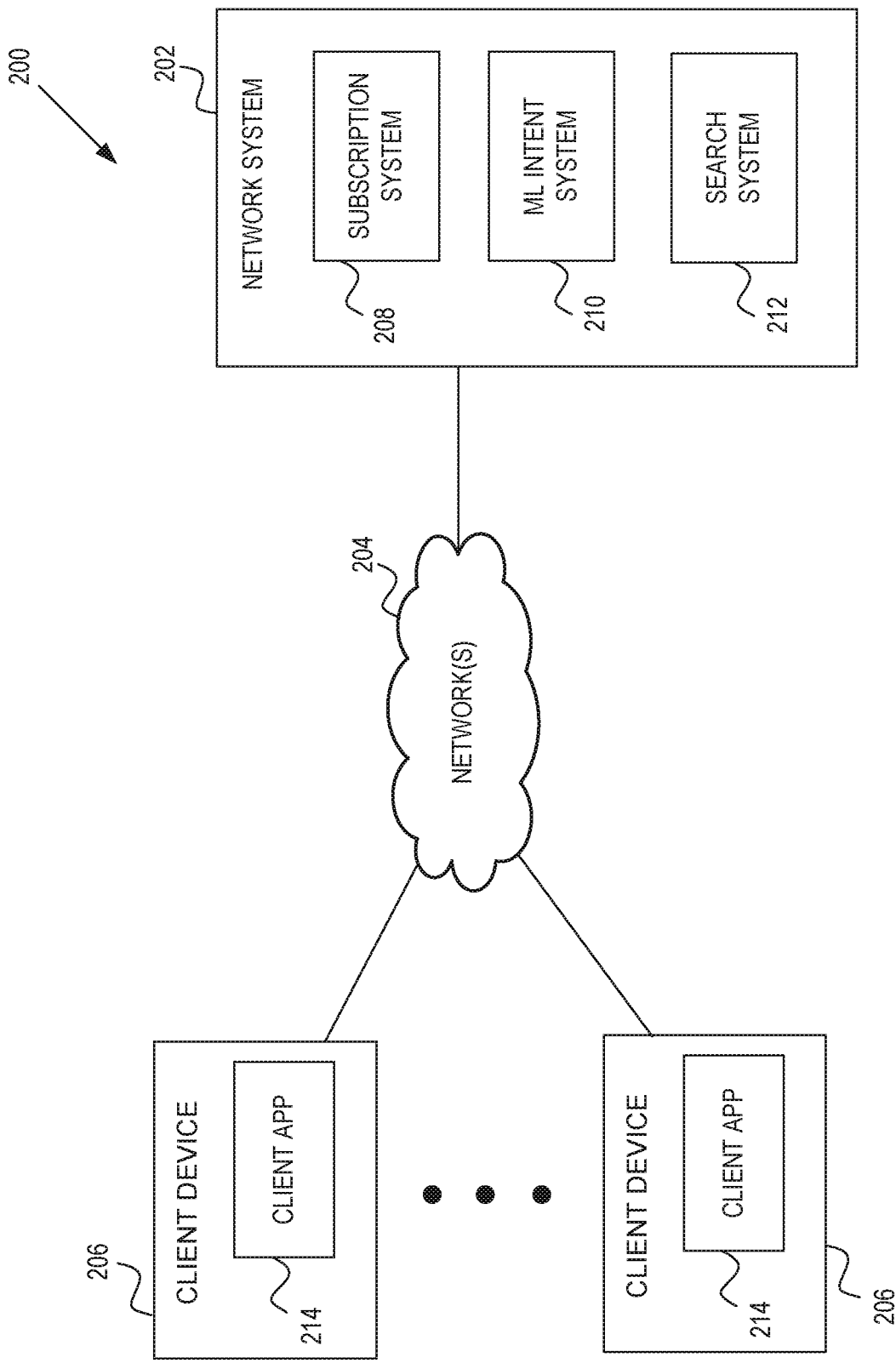
FIG. 2 is a diagram illustrating a network environment suitable for multi-level rich autosuggestions for multi-intent search queries, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a network system that provides multi-level rich autosuggestions for multi-intent search queries. When a user performs a search, the user may have more than one search intent. For example, if a user is interested in Product X, the user may enter "Product X" in the search box and is presented with a variety of suggestions. However, the user may be interested in multiple results such as Product X general information and specification, variations on Product X, comparisons of Product X with similar products, reviews of Product X, and so forth. As a result, the user will need to perform multiple searches by typing each of these queries separately in a search box until the autosuggestion shows the search query and/or the user has identified the correct search query to use.

Conventional autosuggestion boxes do not provide an opportunity at a first level to go to different user search intents whereby a selection of an intent-based suggestion at the first level takes the user to a second level of an autosuggestion box where intent clusters that represent categories of different user intents (which are a subset of the selected intent-based suggestion) are shown. For example, if the user enters "Product X" in the search box, the user can be presented with an intent-based suggestion "Product X" (also referred to herein as a "smart suggestion") that is visually distinguished (e.g., with an icon or in a different color) from non-intent-based autosuggestions (also referred to as "regular selections"). Selection of the intent-based suggestion triggers display of second level autosuggestions in the autosuggestion box. The second level autosuggestions can include intent categories that each comprises an intent cluster of suggestions, whereby the intent categories each represents a different user search intent that is a subset of the intent-based suggestion.

For example, for the intent-based suggestion "Product X", an intent category of "Product X Variants" can provide an intent cluster of autosuggestions of different versions of Product X, an intent category of "Product X vs" can provide an intent cluster of autosuggestions of similar products to compare Product X to, and an intent category of "Product X reviewed by" can provide an intent cluster of autosuggestions of different reviewers that have reviewed Product X. The user can select one of the autosuggestions within one of the intent clusters and be presented either with a corresponding result page or, if a second-level intent category and cluster is available, be presented with the second-level intent category and cluster in the autosuggestion box (e.g., a subset of autosuggestions representing different search intents of the selected autosuggestion). Thus, example embodiments provide a more visual and richer way by which search intent can be clarified and allows users to accelerate a journey of clarifying their intent. It is noted that the terms "autosuggestion" and "suggestion" are used interchangeably herein.

For example, FIG. 1A and FIG. 1B provide illustrations of different levels of autosuggestions that can be provided by various embodiments. As shown in FIG. 1A, a first level of autosuggestions is provided via an autosuggestion box 102 that includes a smart suggestion 104 which is visually distinguished from regular suggestions 106.

If a user selects the smart suggestion 104, a search box 108 and the autosuggestion box 102 are updated to display second level autosuggestions. Specifically, the smart suggestion is now shown as a new query in the search box 108 and the autosuggestions in the autosuggestion box 102 provides intent categories (or category suggestion) 110 that correspond to the smart suggestion 104. Each intent category includes a cluster of subcategory suggestions 112. If the user selects one of the subcategory suggestions, a search is performed and a result page 114 displayed.

FIG. 1B illustrates a further example whereby the selection of the subcategory suggestion at the second level causes third level autosuggestions to be displayed. Specifically, the selected subcategory suggestion is now shown as a new query in the search box 108 and the autosuggestions in the autosuggestion box 102 provides intent categories (or category suggestion) 116 within the selected subcategory suggestion. Each intent category includes a cluster of subcategory suggestions 118. If the user selects one of the subcategory suggestions at the third level, fourth level autosuggestions can be displayed. Any number of levels of autosuggestions can be displayed depending on the original query and subsequent selection of suggestions.

Thus, while conventional autosuggestion boxes only provide one level of autosuggestions whereby a selection takes the user to a result page, example embodiments surface suggestions based on predominant search intents for a given query in a structured manner inside the autosuggestion box. This enables searching a topic more efficiently, reducing time and efforts spent on multiple queries.

As a result, example embodiments provide a technical solution that provides multi-level rich autosuggestions for a multi-intent search query. The technical solution includes using one more machine-learning (ML) models to determine search intents, cluster the search intents, determine relevance of different search intent clusters, and rank the search intent clusters. During a search, a database of the ranked search intent clusters is accessed, and intent clusters identified for population of an autosuggestion box. As a result, one or more of the methodologies described herein facilitate solving the technical problem of efficiently providing search results to a user that has multiple search intents. By using example embodiments, a user easily access relevant search results without having to perform an extraneous number of searches.

FIG. 2 is a diagram illustrating a network environment 200 suitable for multi-level rich autosuggestions for multi-intent search queries, in accordance with example embodiments. A network system 202 is communicatively coupled, via a network 204, to a plurality of client devices 206. In some embodiments, the network system 202 is associated with a single entity (e.g., software provider). The network system 202 comprises a subscriber system 208 such as, for example, Microsoft 365, a machine learning (ML) intent system 210, and a search system 212.

The subscriber system 208 can comprise a cloud-based software-as-a-service (SaaS) system that provides a plurality of applications that generate, edit, and display documents that can be used (e.g., accessed, analyzed) by the client devices 206 and searched by the search system 212. For example, the subscriber system 208 can provide a word processing application that manages text documents, a spreadsheet application that manages spreadsheets, a presentation application that manages presentation slides, and a meeting application that can generate transcriptions of virtual meetings. In some embodiments, the components of the subscriber system 208 works with a corresponding client application 214 at the client device 206.

The ML intent system 210 is configured to generate machine-learning derived intent clusters that are groupings of queries based on user search intents that can be used to derive different levels of autosuggestions by the search system 212 during a search. The ML intent system 210 comprises or accesses one or more machine-trained models that clusters queries based on search intent, determines relevance of the clusters, and determines ranking for the clusters. The ML intent system 210 will be discussed in more detail in connection with FIG. 3 below.

The search system 212 is a component of the network system 202 that performs searches both on the Internet and within the network system 202 (e.g., within the subscription system 208). Example embodiments use the search system 212 to search for results based on what a user types into a search box or selects from an autosuggestion box. The search system 212, during a search, communicates with the ML intent system 210 to determine top ranking intent-based autosuggestions that correspond with what a user has typed (or started to type) in the search box. The search system 212 will be discussed in more detail in connection with FIG. 4 below.

Each client device 206 is a device of a user of the network system 202. The client devices 206 may comprise, but are not limited to, a smartphone, tablet, laptop, multi-processor systems, microprocessor-based or programmable consumer electronics, game consoles, set-top boxes, a server, or any other communication device that can perform operations with respect to the network system 202 via the network 204. The operations can include, for example, generating, editing, and viewing documents associated with the subscription system 208 and/or performing searches using the search system 212.

In example embodiments, each client device 206 comprises one or more client applications 214 that communicates with the network system 202 for added functionality. For example, the client application 214 may be a local version of an application or component of the subscription system 208 or the search system 212.

Depending on the form of the client devices 206, any of a variety of types of connections and networks 204 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 204 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 204 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 204 is a wired connection (e.g., an Ethernet link) and the network 204 is a LAN, a WAN, the Internet, or another packet-switched data network. Accordingly, a variety of different configurations are expressly contemplated In example embodiments, any of the systems, devices, or services (collectively referred to as "components") shown in, or associated with, FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 11, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 2 or their functions may be combined, or the functions described herein for any single component may be subdivided among multiple components. Additionally, any number of client devices 206 may be embodied within the network environment 200. While only a single network system 202 is shown, alternative embodiments contemplate having more than one network system 202 to perform the operations discussed herein (e.g., each localized to a particular region).

Figure 3:
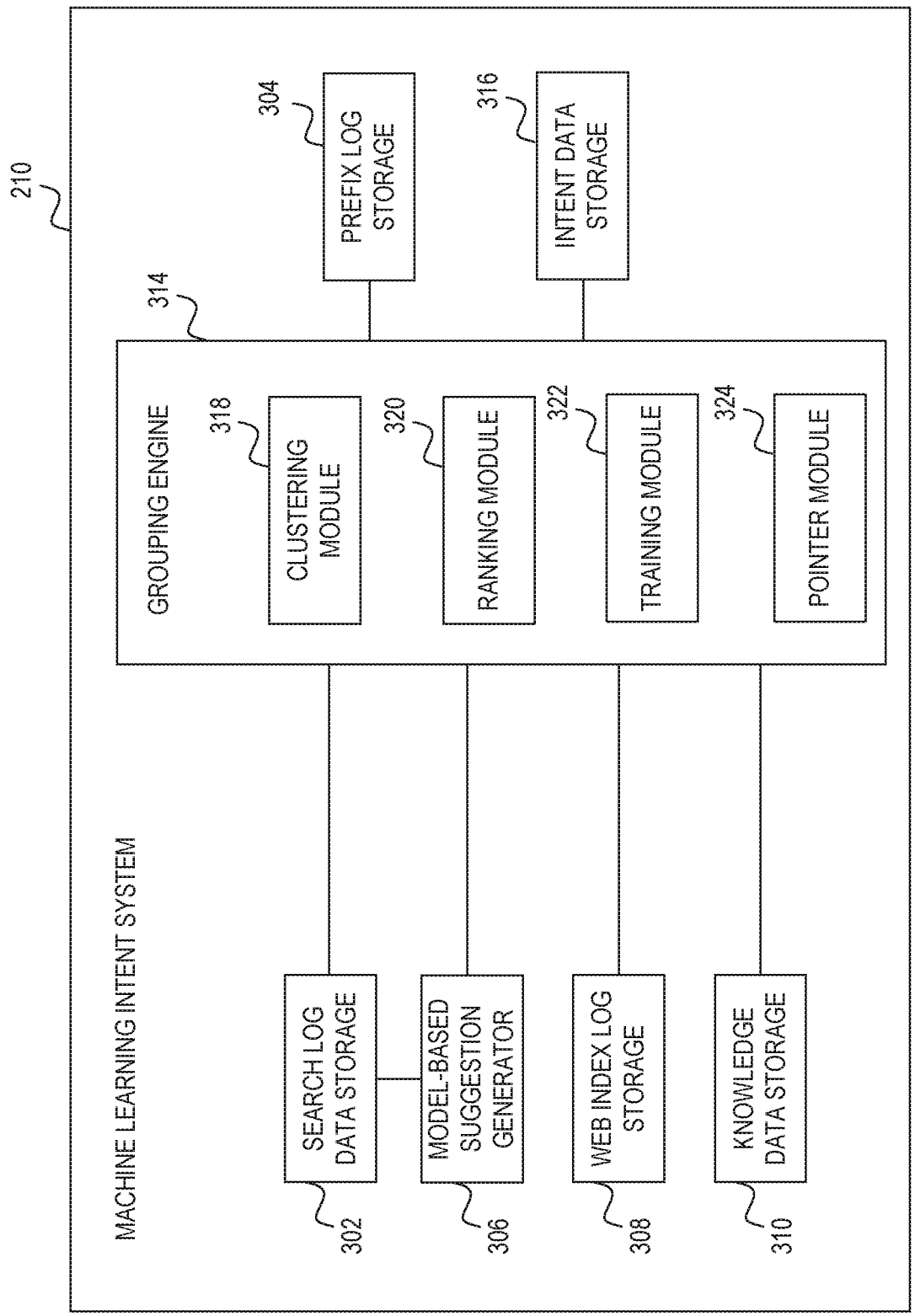
FIG. 3 is a diagram illustrating components of a machine learning intent system, according to some example embodiments.

FIG. 3 is a diagram illustrating components of the machine learning intent system 210, according to some example embodiments. The machine learning intent system 210 is configured to generate a database of machine-learning derived intent clusters. To enable these operations, the machine learning intent system 210 comprises or accesses a search log data storage 302, a prefix log storage 304, a model-based suggestion generator 306, a web index log storage 308, a knowledge data storage 310, a grouping engine 314, and an intent data storage 316 that are configured to communicate with each other (e.g., via a bus, shared memory, or a switch. In example embodiments, each of the search log data storage 302, prefix log storage 304, model-based suggestion generator 306, web index log storage 308, and knowledge data storage 310 provides data to the grouping engine 312, which determines top search intent groupings for each given prefix using n-gram based clustering. Alternative embodiments may comprise more or less components, combine the functions of some these components into a single component, or making some components optional.

The search log data storage 302 comprises search logs. The search logs refer to data collected by the search system 212 on what users have searched for in the past. The search log information may be available across multiple geographies and user queries. In example embodiments, the search logs are used to come up with query suggestions by analyzing patterns in the search terms. For instance, the search logs indicate what queries are performed within a same session and these queries may indicate intent. For example, if many users search for "best running shoes" and later also search for "Nike running shoes" in the same session, the grouping engine 312 can suggest "Nike" as a possible way to filter down the intent. Thus, the information from the search logs is used for intent grouping by the grouping engine 312.

The prefix log storage 304 is a tree-based storage where every node is a possible character that the user enters in a search box or search bar. Thus, the prefix log storage 304 provides efficient prefix matching. The prefix log storage 304 can be used to associate given prefixes with top search intent groupings by the grouping engine 314 in some embodiments. Additionally, when a user starts to type a query, the search system 212 can use the prefix log storage 304 to quickly find all the search terms that start with the same prefix. While the prefix log storage 304 is shown as being part of the machine learning intent system 210, alternatively, the prefix log storage 304 can be located elsewhere in the network system 202 (e.g., in the search system 212).

The model-based suggestion generator 306 generates suggestions that go beyond those that can be derived from the search logs. In example embodiments, the model-based suggestion generator 306 comprises one or more machine-learning language models (e.g., artificial intelligence models) that are trained to understand and generate natural language and, more specifically, generate new suggestion candidates beyond those derived from the search logs. In one embodiment, the model-based suggestion generator 306 uses the information from the search logs data storage 302 to train the language models. Then the trained language models are used to generate new, related suggestions.

The web index log storage 308 provides information from web documents while the knowledge data storage 310 provides a knowledge base. In addition to what is seen in the search logs and derived from the language models, it is important to ground the data on knowledge. The search logs alone may not be sufficient since it does not capture the entirety of what a user could query on the web and does not capture the entirety of the knowledge base. Thus, structured pieces of information from both web documents (e.g., from the web index log storage 308) and the knowledge data storage 310 are used by the grouping engine 314 to provide a refined set of intent. For example, by identifying the possible entities from a query, the knowledge data can be used, by the grouping engine 314, to map each entity to a predefined list of intents ranked by usage and importance.

Once data is collected or accessed from the search logs data storage 302 (e.g., search logs), the model-based suggestion generator 306 (e.g., language model-based suggestions), the web index log storage 308 (e.g., web documents), and knowledge data storage 310 (e.g., structured knowledge base), a clustering module 318 of the grouping engine 314 uses the data to group appropriate intents in a stack. In example embodiments, the clustering module 318 uses a machine learning model (or clustering algorithm) to group similar intents for a given query input (or prefix) together. The choice of a machine-learning model or clustering algorithm used can be dependent on specific characteristics of the data and the desired level or granularity. Example clustering algorithms include K-means clustering, mean-shift clustering, and density-based spatial clustering of applications with noise (e.g., DBSCAN).

A ranking module 320 of the grouping engine 314 is configured to determine a relevance and ranking of each intent cluster for a given query input. In some embodiments, the ranking module 320 applies a relevance model (e.g., a relevance algorithm) to the clusters generated by the clustering module 318. The relevance model is trained from the search logs, web documents, and knowledge base. The ranking module 320 then determines a ranking of each cluster that is determined to be relevant (e.g., exceeds a relevance threshold). In some embodiments, the ranking module 320 applies a ranking model (e.g., a ranking algorithm) to the intent clusters. The ranking model is trained from usage of past searches. For example, the ranking model computes a probability or likelihood that a user is going to click on a given intent based on a query input (or prefix).

The ranking module 320 ensures that the most relevant and useful results are returned as autosuggestions first, while less relevant results may be returned later (or not at all). This increases the chance of a user finding the information they are looking for quickly and efficiently. In one embodiment, a training module 322 uses supervised and semi-supervised learning algorithms to train one or more machine-learning ranking models based on datasets of search queries, associated results, and other relevant information, such as user feedback, click-through data, and relevance labels. The training module 322 can retrain the ranking model periodically. For example, the ranking model can be updated weekly with rolling two-years' worth of logs. In alternative embodiments, the training module 322 may be located outside of the grouping engine 314 and/or elsewhere in the network system 202.

In some embodiments, the grouping engine 314 includes a pointer module 324 that identifies and assigns imagery (e.g., images, videos) to each cluster. The imagery can be determined based on data from web documents (e.g., the web index log storage 308) and knowledge base (e.g., knowledge data storage 310). The imagery may be stored in an image database (not shown). The pointer module 324 assigns a pointer corresponding to each image/video in the image database to the intent clusters (e.g., for each intent category and subcategory suggestion). In alternative embodiments, the pointer module 324 may be located outside of the grouping engine 314 and/or elsewhere in the network system 202.

Once the grouping of intents is performed and ranked, it is stored to the intent data storage 316. The intent data storage 316 stores the grouping of intents in a manner that is consumable real-time in a query suggestion space. Additional information can be stored around the intent groupings with an ability to query items on multiple pivots (e.g., clustering multiple queries into an intent provides a structured pivot for a user to traverse the possible queries the user may want to ask the search engine). For example, the corresponding image points are stored with the grouping of intents in the intent data storage 316. Other additional information can include pointers to kinds of suggestions from each intent group, a semantic vector representation of the intent group that is used at runtime/application time to rank the intent group with respect to the original request, and/or visual cues to the intent group with images and alternative namings to make it easily consumable. This provides efficient storage and performant enterprise-to-enterprise results in various embodiments.

Figure 4:
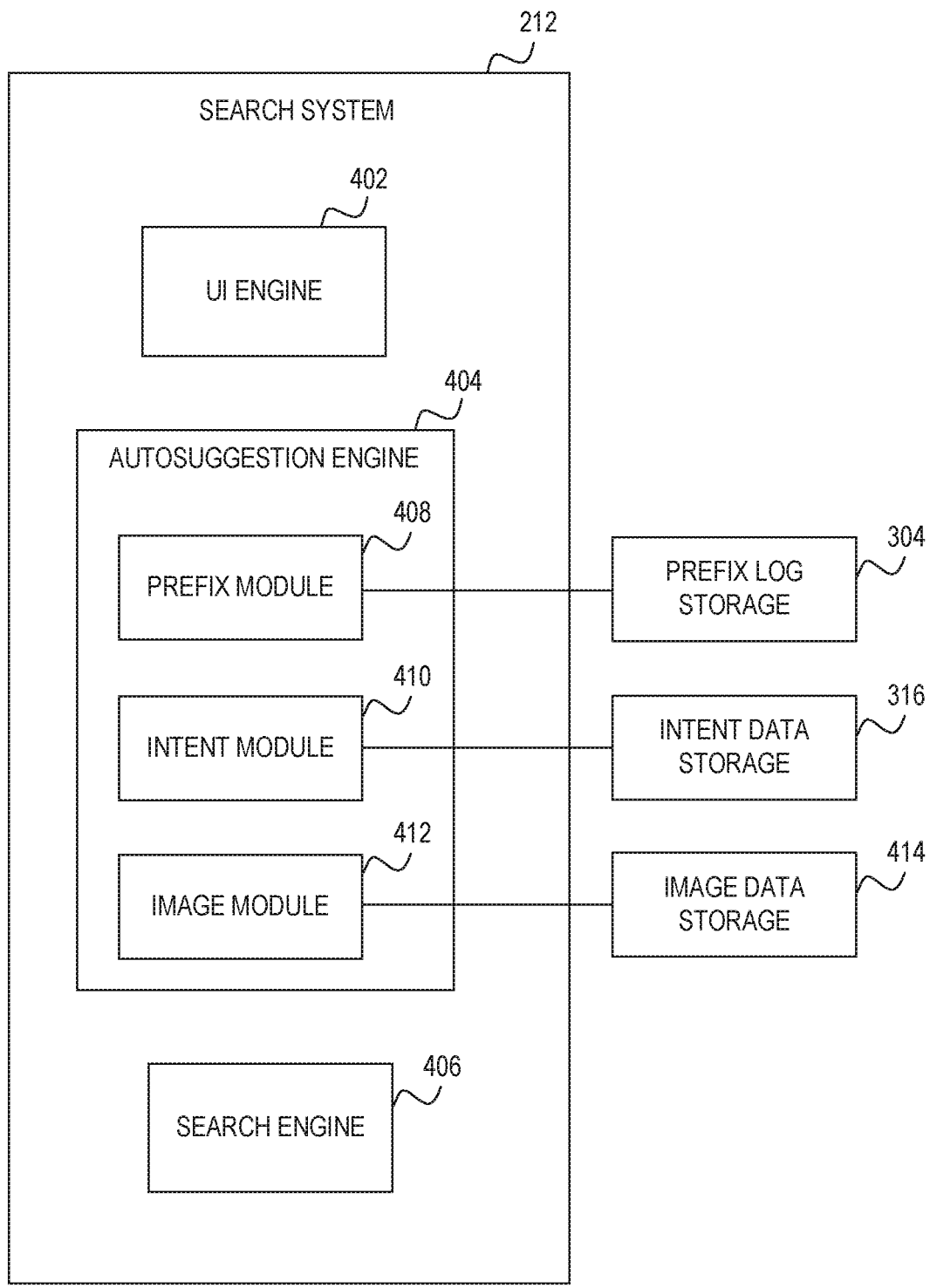
FIG. 4 is a diagram illustrating components of a search system, according to some example embodiments.

FIG. 4 is a diagram illustrating components of the search system 212, according to some example embodiments. The search system 212 is configured to receive a search query and perform a search based on the search query. Further still, the search system 212 can receive a partial input of one or more keystrokes (e.g., a prefix) and provide autosuggestions including smart suggestions and multiple levels of intent categories and groupings of subcategory suggestions. To enable these operations, the search system 212 comprises a user interface (UI) engine 402, an autosuggestion engine 404, and a search engine 406 that are configured to communicate with each other (e.g., via a bus, shared memory, or a switch.

The UI engine 402 is configured to provide a search user interface including a search box and an autosuggestion box. Additionally, the UI engine 402 presents a search result page in response to a search performed by the search system 212. In example embodiments, the UI module detects inputs typed into the search box. The inputs can include a query prefix as a user is starting to type their query. With each keystroke, the UI engine 402 triggers the autosuggestion engine 404 to provide autosuggestions that may be the complete query that the user intends to type. When autosuggestions are available, the UI engine 402 updates the autosuggestion box to include the autosuggestions.

If a user selects a smart suggestion, the UI engine 402 displays a second level of autosuggestions. If the user selects a subcategory suggestion that has a further level of autosuggestions, the UI engine 402 displays a next level of autosuggestions. Finally, if the user selects a regular suggestion (e.g., not a smart suggestion) or a subcategory suggestion that does not have a further level, the UI engine 402 displays a corresponding search result page.

The autosuggestion engine 404 is configured to determine and provide autosuggestions for a query input. In example embodiments, the autosuggestion engine 404 receives the query prefix from the UI engine 402 and provides a suggestions response (e.g., a JSON suggestions response) to the UI engine 402. The suggestions response includes the autosuggestion including points to images/videos. To enable these operations, the autosuggestion engine 404 comprises a prefix module 408, an intent module 410, and an image module 412.

The prefix module 408 is configured to identify queries based on the query prefix received from the UI engine 402. In example embodiments, the prefix module 408 accesses the prefix log storage 304 to determine all search terms that start with the same prefix as the query prefix. As discussed, the prefix log storage 304 is a tree-based storage where every node is a possible character that the user enters in the search box. Thus, the prefix log storage 304 is used for efficient prefix matching by the prefix module 408.

The intent module 410 is configured to determine machine-learning derived intent clusters or groupings that correspond to the search terms identified by the prefix module 408. In example embodiments, the intent module 410 accesses the intent data storage 316 and identifies a top (machine-learning derived) intent cluster based on the search terms. In selecting the top intent cluster, the intent module 410 may identify the intent cluster having the highest probability from all the matching intent clusters.

The image module 412 is configured to obtain and return images/videos that are associated with the top intent cluster identified by the intent module 410. In example embodiments, the intent cluster includes pointers to images/videos. Using the pointers, the image module 412 accesses an image data storage 414 that comprises an index of images and videos and obtains the images and/or videos that correspond to the pointers. The intent cluster and the images and/or videos are then returned to the UI engine 402 as the suggestions response. In some embodiments, pointers may also be used to point to other content such as audio content, additional textual information to describe the intent, metadata on the intent (e.g., trending, new) to help the user traverse the autosuggestion. Additionally, some embodiments may identify and provide more than one top intent cluster.

While the image module 412 is shown as part of the autosuggestion engine 404, alternative embodiments may locate the image module 412 outside of the autosuggestion engine 404. In these embodiments, the suggestions response includes the intent cluster information and image pointers. The UI engine 402 then works with the image module 412 to obtain the corresponding images and videos using the image pointers.

Using the suggestions response, the UI engine 402 updates the autosuggestion box to display the autosuggestions. At a first level, the autosuggestions can include at least one smart suggestion. In some embodiments, the suggestions response includes all the different levels associated with the intent cluster. Thus, if the user selects a subcategory suggestion that includes a next level of autosuggestions (e.g., intent categories and groupings of subcategory suggestions), the next level of autosuggestions is presented. In other embodiments, the selection of the subcategory suggestion may trigger the autosuggestion engine 404 to perform operations to determine the next level of autosuggestions.

With each additional keystroke, the autosuggestion engine 404 is triggered to determine autosuggestions. In some cases, the suggestions response comprises a same intent cluster, while in other cases, the additional keystroke results in a different search term and/or matching intent cluster. If the user continues to type a search query to completion, a smart suggestion may not be presented as an autosuggestion. This is due to the precedence of what the user types trumping any autosuggestions.

When the user selects a lowest level search query (e.g., a regular suggestion, a subcategory suggestion with no further levels) or completes the search query typed in the search box, the search engine 406 performs a search. The search engine 406 returns search results to the UI engine 402, which presents the results on a search result page.

Figure 5:
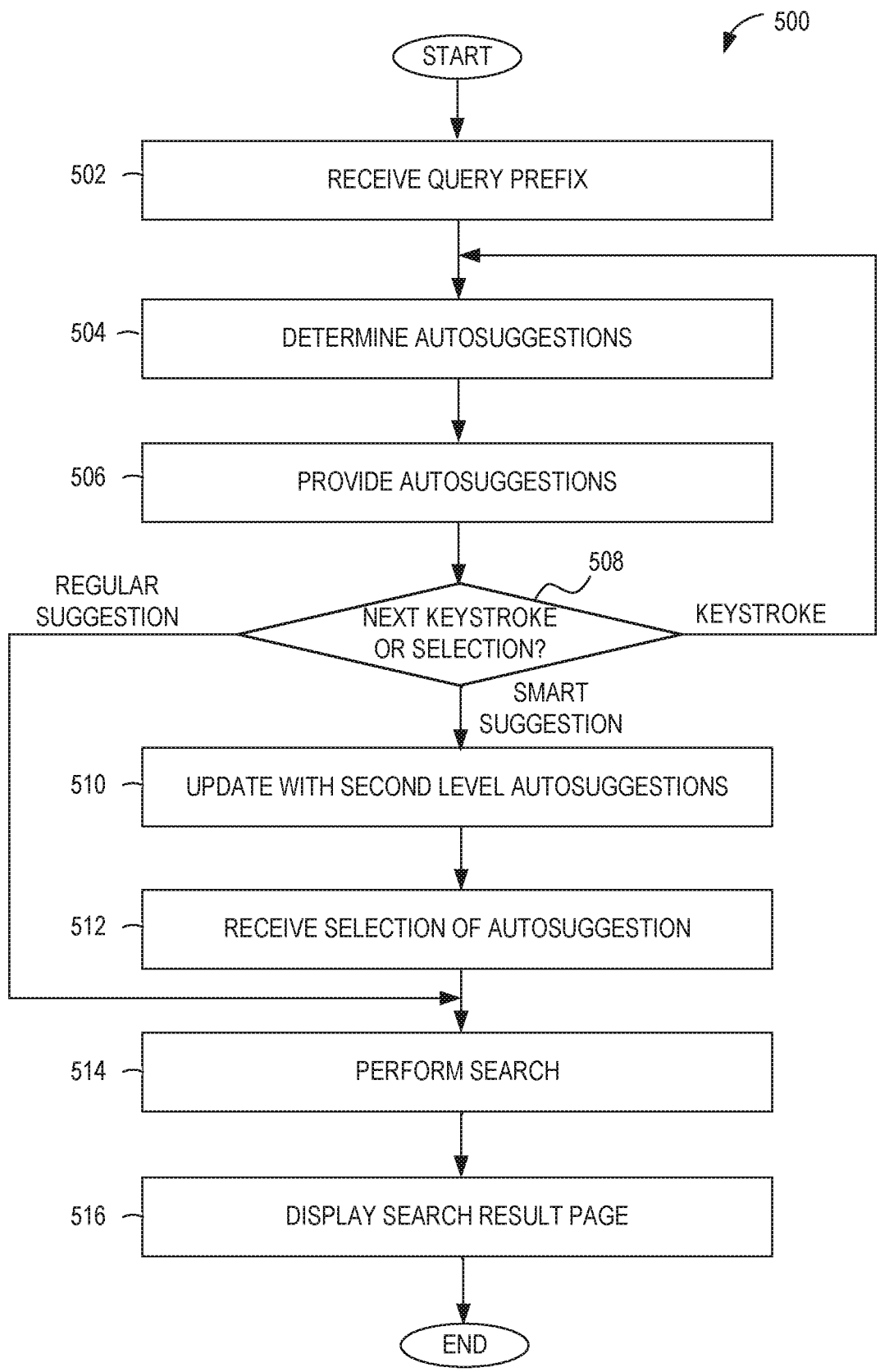
FIG. 5 is a flowchart illustrating operations of a method for performing a search using multi-level rich autosuggestions for multi-intent search queries, according to some example embodiments.

FIG. 5 is a flowchart illustrating operations of a method 500 for performing a search using multi-level rich autosuggestions for multi-intent search queries, according to some example embodiments. Operations in the method 500 may be performed by the network system 202 in the network environment 200 described above with respect to FIG. 2-FIG. 4. Accordingly, the method 500 is described by way of example with reference to these components in the network system 202. However, it shall be appreciated that at least some of the operations of the method 500 may be deployed on various other hardware configurations or be performed by similar components residing elsewhere in the network environment 200. Therefore, the method 500 is not intended to be limited to these components.

In operation 502, the search system 212 receive a query prefix entered in a search box of a search user interface (UI) presented by the UI engine 402. The query prefix comprises one or more keystrokes entered by a user in the search box.

In operation 504, the autosuggestion engine 404 determines autosuggestions to provide to the user based on the query prefix. Operation 504 will be discussed in more detail in connection with FIG. 6 below.

In operation 506, the UI engine 402 provides autosuggestions in an autosuggestion box associated with the search box. For example, the autosuggestion box can be shown below the search box. If the autosuggestions determined in operation 504 includes a smart suggestion, the autosuggestion box will show the smart suggestion visually distinguished from normal suggestions. The smart suggestion is a first-level suggestion of a top-ranking machine-learning derived intent cluster.

In operation 508, a determination is made whether a next input is a keystroke or a selection of a suggestion. If the next input is a keystroke, the method 500 returns to operation 504 where autosuggestions are determined based on the updated prefix.

If, in operation 508, the next input is a selection of a smart autosuggestion, the method 500 continues to operation 510 where the autosuggestion box is updated with second level autosuggestions. The second level autosuggestions can include one or more intent categories whereby each intent category comprises a grouping of subcategory suggestions.

In operation 512, a selection of a suggestion from the second level is received by the UI engine 402. Based on the selection, a search is performed in operation 514. More specifically, the search engine 406 takes the selected suggestion as the search query and performs a search for corresponding information.

In some cases, there may be one or more further levels of autosuggestions. In these cases, the selection of the suggestion in operation 512 will cause an update to the autosuggestion box with a next level of autosuggestions. This continues until there is a selection of a lowest level suggestion. Once the lowest level suggestion is selected, the search is performed in operation 514.

Returning to operation 508, if the next input is a selection of a regular autosuggestion, then the search system 212 operates like a conventional search system and performs a search in operation 514.

In operation 516, the UI engine 402 displays a search result page that comprises the results of the search performed by the search engine 406.

Figure 6:
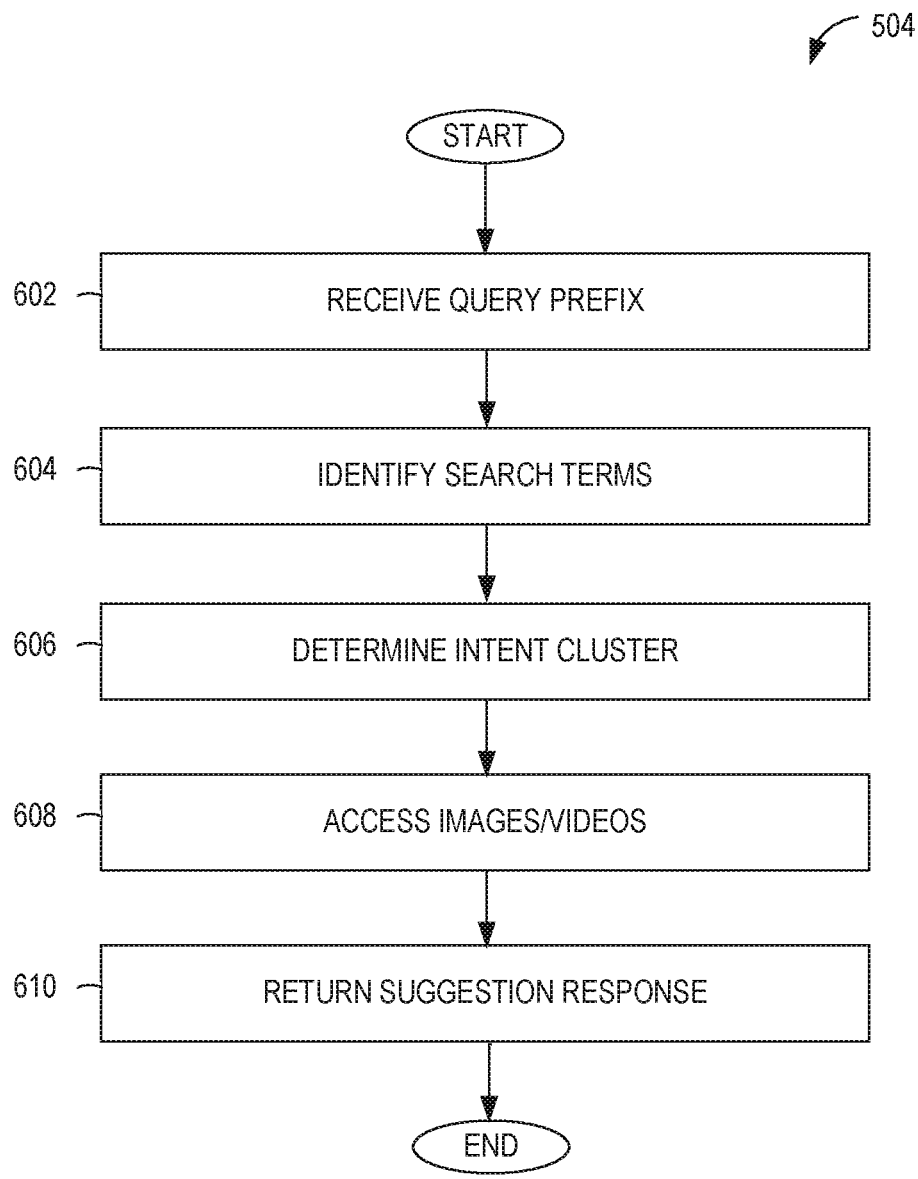
FIG. 6 is a flowchart illustrating operations of a method for determining autosuggestions, according to some example embodiments.

FIG. 6 is a flowchart illustrating operations of a method 600 for determining autosuggestions, according to some example embodiments. Operations in the method 600 may be performed by the search system 212 (e.g., the autosuggestion engine 404) described above with respect to FIG. 4. Accordingly, the method 600 is described by way of example with reference to this component in the search system 212. However, it shall be appreciated that at least some of the operations of the method 600 may be deployed on various other hardware configurations or be performed by similar components residing elsewhere in the network environment 100. Therefore, the method 600 is not intended to be limited to this component.

In some embodiments, when the UI engine 402 receives the query prefix in 502, the UI engine 402 sends an autosuggestion request to the autosuggestion engine 404. The autosuggestion request includes the query prefix. Thus, in operation 602, the autosuggestion engine 404 receives the query prefix.

In operation 604, the autosuggestion engine 404 identifies search terms that match the query prefix. In example embodiments, the prefix module 408 accesses the prefix log storage 304 and identifies all search terms that start with the same prefix as the query prefix.

In operation 606, the autosuggestion engine 404 determines a top intent cluster. In example embodiments, the intent module 410 accesses the intent data storage 316 and identifies machine-learning derived intent clusters or groupings that correspond to each search term identified by the prefix module 408. In example embodiments, the intent module identifies a top (machine-learning derived) intent cluster that matches each the search term. In some cases, the intent module 410 selects one intent cluster (e.g., highest probability or ranking intent cluster) to return as a smart suggestion. In some cases, more than one intent cluster can be returned as smart suggestions.

In operation 608, the autosuggestion engine 404 accesses images and videos that corresponding to the smart suggestion(s) that will be returned to the UI module 402. The intent clusters identified by the intent module 410 includes pointers to images and videos. In example embodiments, the image module 412 accesses and retrieves the images and videos from the image data storage 414 via the pointers. The images and videos may be associated with each intent category and/or subcategory suggestion.

In operation 610, the autosuggestion engine 404 returns a suggestions response to the user engine 402. In one embodiment, the suggestion response is a JSON suggestions response, although other forms of responses may be used. The suggestions response includes the one or more smart suggestions and corresponding images and/or videos.

Figure 7:
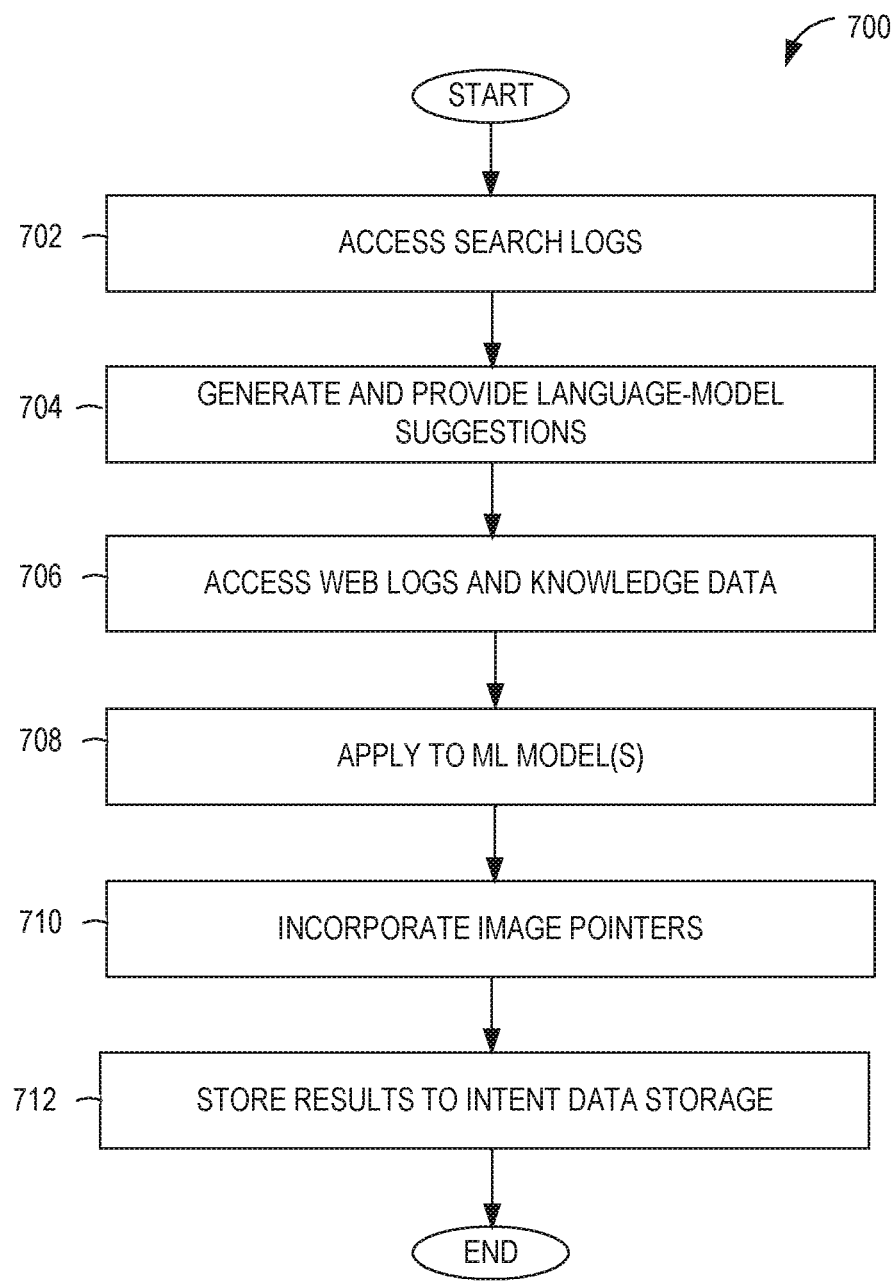
FIG. 7 is a flowchart illustrating operations of a method for generating machine learning-derived intent clusters, according to some example embodiments.

FIG. 7 is a flowchart illustrating operations of a method 700 for generating machine learning-derived intent clusters, according to some example embodiments. Operations in the method 700 may be performed by the machine learning intent system 210 described above with respect to FIG. 3. Accordingly, the method 700 is described by way of example with reference to these components in the machine learning intent system 210. However, it shall be appreciated that at least some of the operations of the method 700 may be deployed on various other hardware configurations or be performed by similar components residing elsewhere in the network environment 100. Therefore, the method 700 is not intended to be limited to these components.

In operation 702, the grouping engine 314 accesses search logs. In example embodiments, the clustering module 318 accesses the search logs from the search log data storage 302. The search logs refer to data collected by the search system 212 on what users have searched for in the past. In example embodiments, the search logs are used by the clustering module 318 to derive suggestions by analyzing patterns in the search terms.

In operation 704, the model-based suggestion generator 306 generates language model suggestions. These suggestions go beyond those that can be derived from the search logs. In example embodiments, the model-based suggestion generator 306 comprises one or more machine-learning language models that are trained to understand and generate new suggestion candidates beyond those derived from the search logs. In one embodiment, the model-based suggestion generator 306 uses the information from the search logs data storage 302 to train the language models. Then, the trained language models are used to generate new, related suggestions. These new, related suggestions are then provided to the clustering module 318.

In operation 706, the grouping engine 314 accesses web logs and knowledge data. In example embodiments, the clustering module 318 accesses web logs from the web index log storage and accesses knowledge data from the knowledge data storage 310. The structured pieces of information from both web documents (e.g., from the web index log storage 308) and the knowledge data storage 310 are used by the grouping engine 314 to provide a refined set of intent.

In operation 708, the grouping engine 314 applies all of the data (e.g., search logs, language model-based suggestions, web documents, and structured knowledge base) to one or more machine-learning clustering models. Specifically, the clustering module 318 of the grouping engine 314 uses the data to group appropriate intents in a stack. In example embodiments, the clustering module 318 uses the machine learning clustering model(s) to group similar intents for a given query together.

After the clustering, the ranking module 320 of the grouping engine 314 determines relevance and ranking of each intent cluster for a given query input. In some embodiments, the ranking module 320 applies a relevance machine-learning model (e.g., a relevance algorithm) to the intent clusters generated by the clustering module 318 to determine relevance. The ranking module 320 then determines a ranking of each intent cluster that is deemed relevant (e.g., above a relevance threshold). In some embodiments, the ranking module 320 applies a ranking machine-learning model (e.g., a ranking algorithm) to these intent clusters. For example, the ranking model computes a probability or likelihood that a user is going to click on a given intent based on a particular query input (or query prefix).

In operation 710, the grouping engine 314 incorporates image pointers with the intent clusters. In example embodiments, the pointer module 324 identifies and assigns imagery (e.g., images, videos) to each intent cluster. The imagery can be determined based on data from web documents (e.g., the web index log storage 308) and knowledge base (e.g., knowledge data storage 310). The images may be stored in the image data storage 414 and a pointer corresponding to each image/video in the image data storage 414 is included by the image module 412 with the intent clusters.

In operation 712, the grouping engine 314 stores results of the intent clustering to the intent data storage 316. The intent data storage 316 is then accessed during a search to return intent clusters based on query inputs (e.g., query prefixes).

While the operations of FIG. 5-FIG. 7 are shown in a particular order, alternative embodiments may practice the operations in a different order. Additionally, one or more of the operations may be made optional in various embodiments.

Figure 8A:
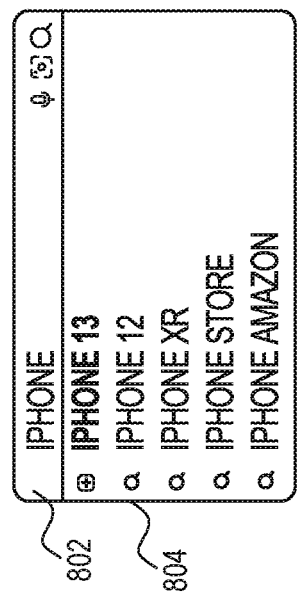
FIG. 8A to FIG. 8D are example screenshots illustrating a search box and different levels of autosuggestions in an autosuggestion box.

FIG. 8A to FIG. 8D are example screenshots illustrating a search box and different levels of autosuggestions in an autosuggestion box. Referring to FIG. 8a, a user has typed "iPhone" in a search box 802. The search system 212 provides suggestions in an autosuggestion box 804 that are based on the query prefix "iPhone." The suggestions include, for example, iPhone 13, iPhone 12, iphone XR, iPhone Store, iPhone Amazon. iPhone 13 is a smart suggestion and is visually distinguished from the other (regular) suggestions. In the present example, the iphone 13 suggestion includes a "+" icon that indicates that it is a smart suggestion. Alternative embodiment may use other icons or manners of visually distinguishing the smart suggestions (e.g., different color font, bold font).

Figure 8B:
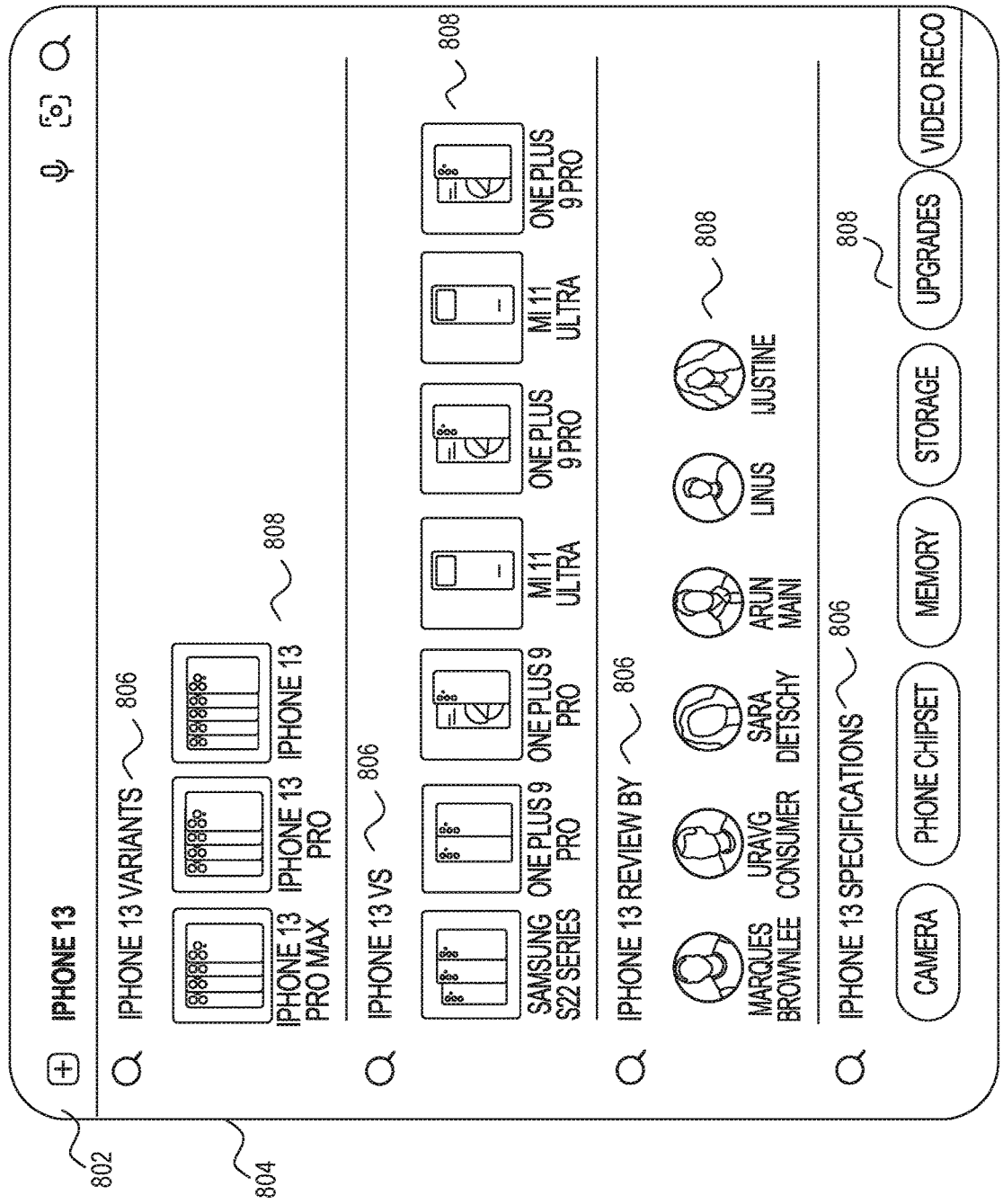

If the user selects the smart suggestion (e.g., clicks on it), the set of suggestions in the autosuggestion box 804 gets replaced with a new set of rich autosuggestions which will now help the user with the different search intents that the user may have. This new set of autosuggestions is a second-level of autosuggestions. FIG. 8B shows an example screenshot illustrating the updated autosuggestion box 804 with the second-level of autosuggestions. Additionally, the search box 802 is updated to include the selected smart suggestion.

The autosuggestions include a plurality of intent categories 806. In some embodiments, the ranking of the suggestions in the autosuggestion box 804 is based on existing ranking of the suggestions with respect to the smart suggestion. Here the top ranked intent category 806 is iPhone 13 variants followed by iPhone 13 comparisons (e.g., "iPhone 13 VS"), iPhone 13 reviews by reviewers, and iPhone 13 specifications. Thus, a top-ranking intent category 806 (e.g., highest probability the user is looking for information with this intent) is the different types of iPhone 13 variants. A next highest ranking intent category 806 comprises comparisons of the iPhone 13 versus other models. This is followed by reviews of the iPhone 13 by various reviewers. The final intent category 806 comprises various specifications of the iPhone 13.

In some embodiments, the ranking is based on an overall search intent of the user. For instance, if the user is trying to make a buying decision, typically the user will want to figure out the phone that they are interested in (e.g., first row are variants). Then, the user may compare with other models (e.g., second row are comparisons with other models). Then, the user is likely to research reviews of the product (e.g., third row are reviews by others). This overall search intent can be derived from search "journeys" performed by other users (e.g., the search logs).

Each of the intent categories 806 includes a plurality of subcategory suggestions 808. The subcategory suggestions 808 can include images and/or videos. The images and videos are retrieved user pointers to the image data storage 414. For example, the iPhone 13 Variants category includes subcategory suggestions 808 of iPhone 13 Pro Max, iPhone 13 Pro, and iPhone 13 with each displaying an associated image.

Figure 8C:
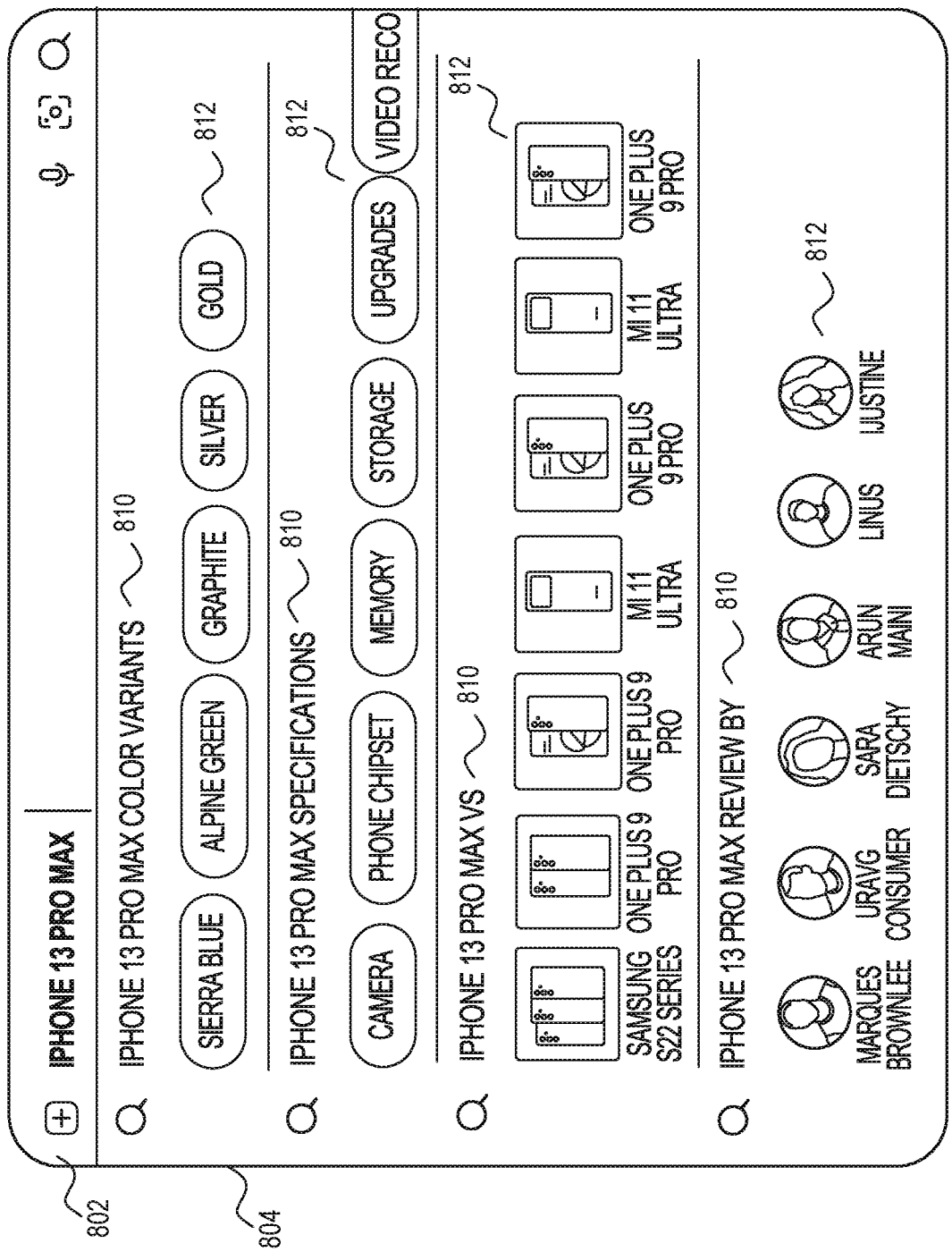

Assuming the user selects an option from the iphone 13 variants intent category 806 (e.g., iPhone 13 Pro Max), the search box 802 and autosuggestion box 804 are updated to show a third level of autosuggestions. Referring now to FIG. 8C, the search box 802 has been updated to display the selected autosuggestion (e.g., iPhone 13 Pro Max).

The autosuggestion box 804 now shows new intent categories 810 corresponding to the iPhone 13 Pro Max search query. A top-ranking intent category 810 is iPhone 13 Pro Max color variants. This is followed by iphone 13 Pro Max specifications, iPhone 13 Pro Max comparisons with other models, and iPhone 13 Pro Max reviews. Within each of these new intent categories 810 are a plurality of subcategory suggestions 812. For example, the iphone 13 Pro Max color variant intent category 810 includes subcategory suggestions 812 of sierra blue, alpine green, graphite, silver, and gold.

At this point, the user can select one of the subcategory suggestions 812 and a search is performed. A search result page can then be presented.

While the example of FIG. 8A-FIG. 8C illustrates three levels of autosuggestions, alternative embodiments can comprise more or less levels. Additionally, the number of levels displayed to a user is dependent on user selection. For example and referring back to FIG. 8B, if the user selects a subcategory suggestion (e.g., camera, memory, storage) from the iPhone 13 specification intent category 806, a search may be performed based on the selected subcategory suggestion and a search result page presented in a next updated user interface.

Figure 8D:
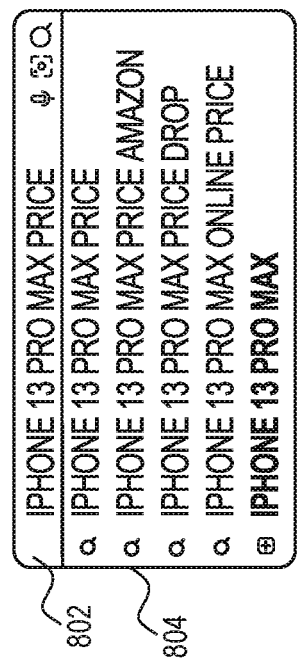

In some embodiments, if the user does not choose any of the options in FIG. 8C (e.g., continues typing; after a predetermined amount of time has passed), the user interface can be refreshed to go to a state where the user gets regular autosuggestions as shown in FIG. 8D. As relevance goes down, the smart suggestion goes down, respectively. For instance, the smart suggestion is now shown at the bottom of the autosuggestion box 804. This allows the user to go back to a previous state by clicking on the smart suggestion.

Figure 9:
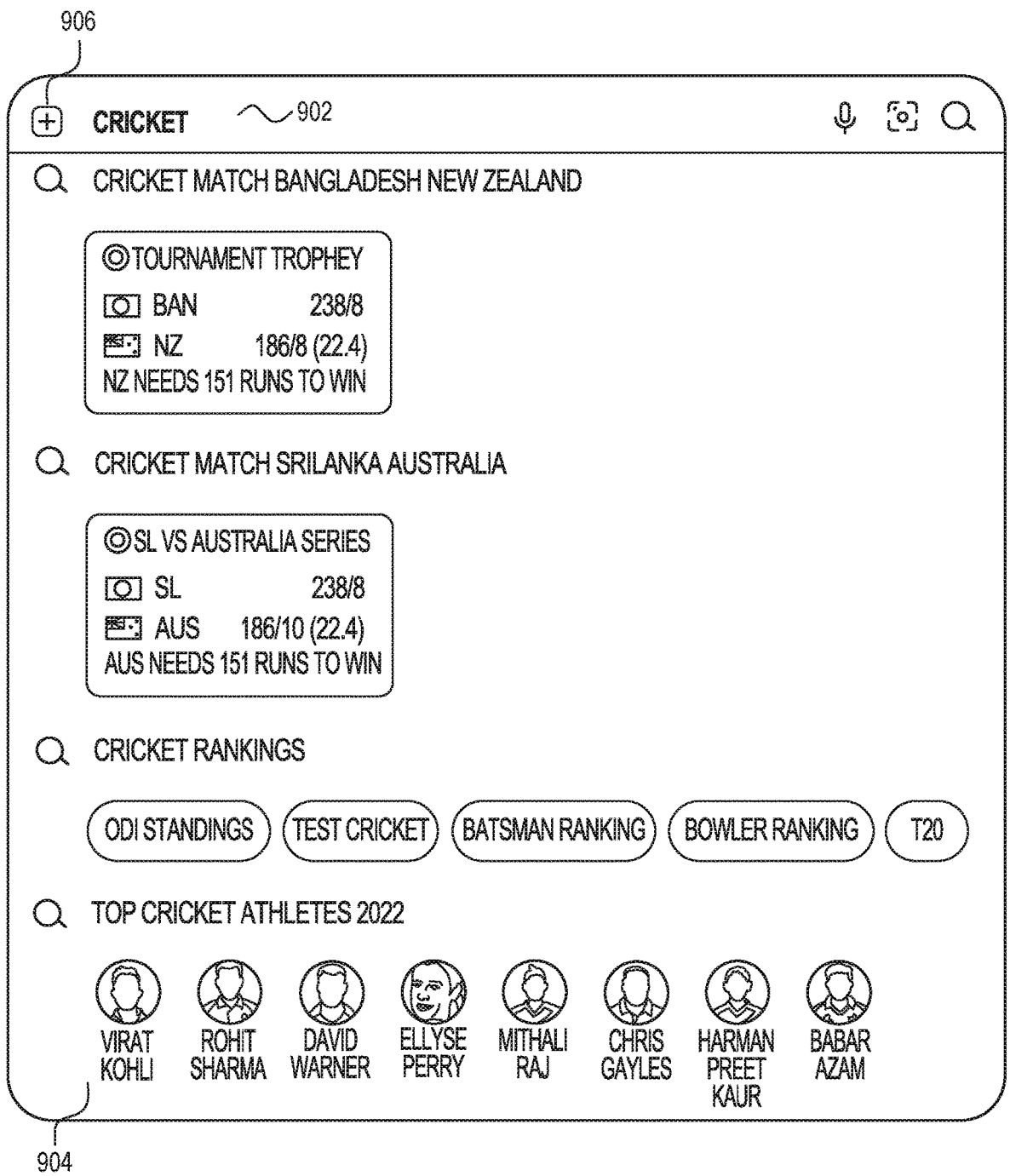
FIG. 9 is an alternative example screenshot illustrating a search box and autosuggestions in an autosuggestion box.

FIG. 9 is an alternative example screenshot illustrating a search box 902 and autosuggestions in an autosuggestion box 904. The example shown in FIG. 9 shows a use case with a sports related search query. Here, the user has selected a smart suggestion of "cricket." In response, the search box 902 is updated to show the selected smart suggestion (e.g., visually distinguished by a "+" icon 906). The selection of the smart suggestion causes several intent categories to be displayed in the autosuggestion box 904 including cricket rankings and top cricket athletes in 2022. The autosuggestions can also include other autosuggestions including "cricket match Bangladesh New Zealand" and "cricket match Sri Lanka Australia," which do not have subcategory suggestions.

FIG. 10 is a further example screenshot illustrating a search box 1002 and autosuggestions in an autosuggestion box 1004. The example shown in FIG. 10 shows a use case with an artist search query. Here, the user has selected a smart suggestion of "Ellie Goulding." In response, the search box 1002 is updated to show the selected smart suggestion (e.g., visually distinguished by a "+" icon 1006). The selection of the smart suggestion causes several intent categories to be displayed in the autosuggestion box 1004 including events, albums and titles, songs, and awards. Each of these intent categories includes a plurality of subcategory suggestions. For example, selection of a song may cause a corresponding music video to play whereby the music video is accessed via a pointer to the image data storage 414. Alternatively, audio of the song may play without video. In this alternative case, a pointer to an audio file in an audio data storage may be used instead of a pointer to the image data storage 414.

Figure 11:
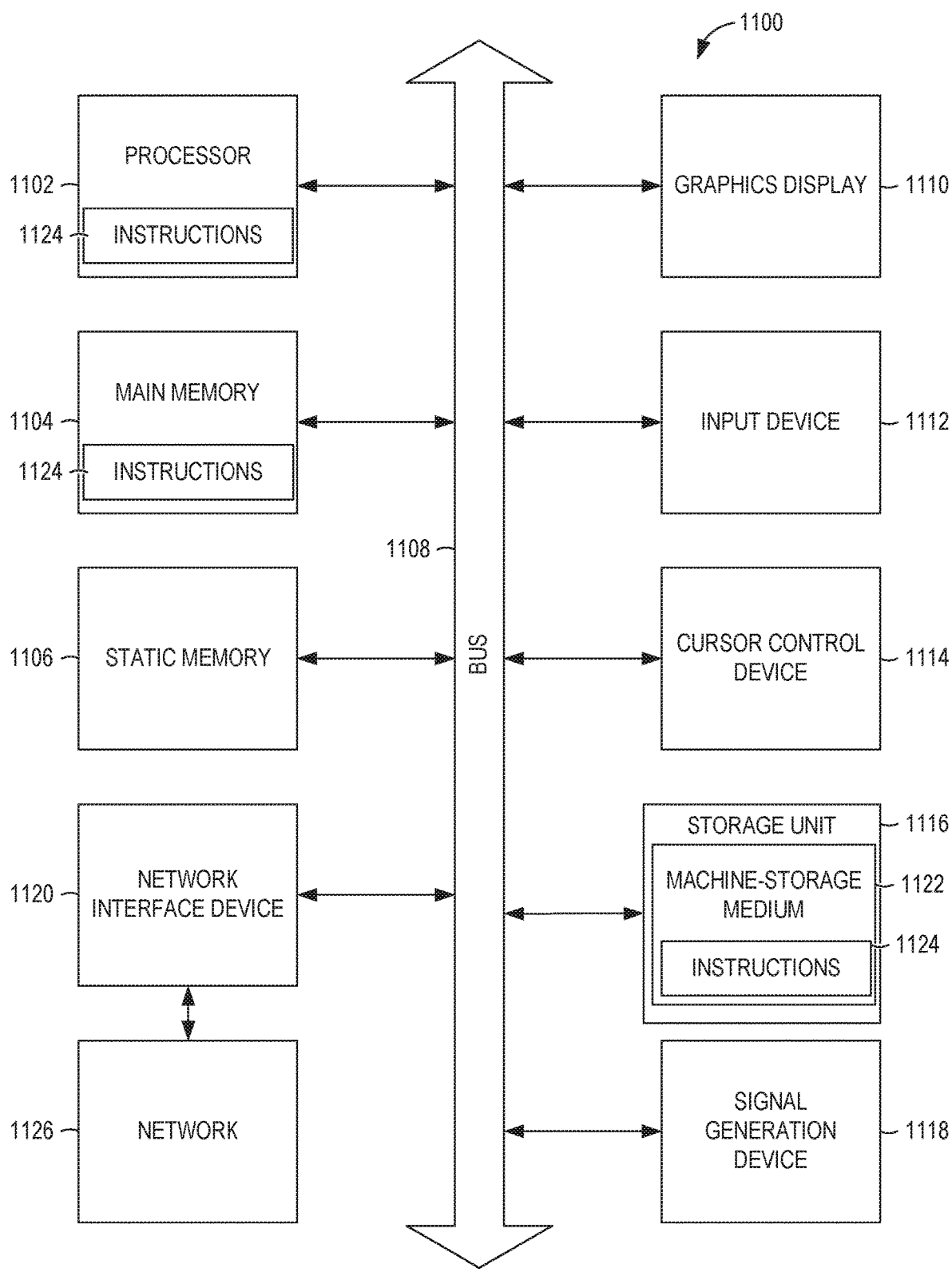
FIG. 11 is a block diagram illustrating components of a machine, according to some example embodiments, able to read instructions from a machine-storage medium and perform any one or more of the methodologies discussed herein.

FIG. 11 illustrates components of a machine 1100, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 11 shows a diagrammatic representation of the machine 1100 in the example form of a computer device (e.g., a computer) and within which instructions 1124 (e.g., software, a program, an application, an applet, an app, or other executable code) for causing the machine 1100 to perform any one or more of the methodologies discussed herein may be executed, in whole or in part.

For example, the instructions 1124 may cause the machine 1100 to execute the flow diagrams of FIG. 4 to FIG. 6. In one embodiment, the instructions 1124 can transform the machine 1100 into a particular machine (e.g., specially configured machine) programmed to carry out the described and illustrated functions in the manner described.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT), or any other display capable of displaying graphics or video). The machine 1100 may also include an input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes a machine-storage medium 1122 (e.g., a tangible machine-storage medium) on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered as machine-storage media (e.g., tangible and non-transitory machine-storage media). The instructions 1124 may be transmitted or received over a network 1126 via the network interface device 1120.

In some example embodiments, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1122 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 may further be transmitted or received over a communications network 1126 using a transmission medium via the network interface device 1120 and utilizing any one of a number of well-known transfer protocols (e.g., HTTP). Examples of communication networks 1126 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing multi-level rich autosuggestions for multi-intent search queries. The method comprises receiving a query prefix entered in a search box of a search user interface; accessing a database of machine-learning derived intent clusters; based on the query prefix, identifying a top-ranking machine-learning derived intent cluster; updating the search user interface to provide a plurality of first level autosuggestions in an autosuggestion box including a smart suggestion, the smart suggestion being a first level suggestion of the top-ranking machine-learning derived intent cluster; receiving a selection of the smart suggestion; and in response to receiving the selection of the smart suggestion, replacing the plurality of first level autosuggestions in the autosuggestion box with second level autosuggestions, the second level autosuggestions comprising one or more intent categories that are subsets of the smart suggestion, each intent category comprising a plurality of subcategory suggestions corresponding to its intent category.

In example 2, the subject matter of example 1 can optionally include wherein at least some of the plurality of subcategory suggestions comprise a corresponding graphical element.

In example 3, the subject matter of any of examples 1-2 can optionally include wherein the graphical element is an image corresponding to a subcategory suggestion of the plurality of subcategory suggestions.

In example 4, the subject matter of any of examples 1-3 can optionally include wherein the graphical element is a video element corresponding to a subcategory suggestion of the plurality of subcategory suggestions, selection of the video element causing a corresponding video to play.

In example 5, the subject matter of any of examples 1-4 can optionally include receiving a selection of a subcategory suggestion from one of the intent categories; and in response to the selection of the subcategory suggestion updating the search box with the selected subcategory suggestion; and replacing the second level autosuggestions with third level autosuggestions in the autosuggestion box, the third level autosuggestions comprising one or more third level intent categories that each represents a different category that is a subset of the selected subcategory suggestion.

In example 6, the subject matter of any of examples 1-5 can optionally include receiving a selection of a subcategory suggestion from one of the intent clusters; and in response to the selection of the subcategory suggestion performing a search based on the selected subcategory suggestion; and causing display of a result page based on the search.

In example 7, the subject matter of any of examples 1-6 can optionally include wherein the smart suggestion is displayed visually distinguished from regular suggestions of the plurality of suggestions in the autosuggestion box with a smart suggestion icon.

In example 8, the subject matter of any of examples 1-7 can optionally include generating the database of machine-learning derived intent clusters, the generating comprising accessing search logs of previous searches performed by users; and applying the search logs to a machine-learning clustering model that clusters similar search intents together for a given query input.

In example 9, the subject matter of any of examples 1-8 can optionally include periodically updating the database of machine-learning derived intent clusters by accessing updated data from the search logs and applying updated data to the machine-learning model.

In example 10, the subject matter of any of examples 1-9 can optionally include accessing suggestions generated by a language model, web documents, and knowledge data, wherein the applying the search logs to the machine-learning clustering model further comprises applying the suggestions generated by the language model, the web documents, and the knowledge data to the machine-learning clustering model.

In example 11, the subject matter of any of examples 1-10 can optionally include ranking the machine-learning derived intent clusters, the ranking comprising applying the machine-learning derived intent clusters to a machine-learning ranking model that determines a probability that each machine-learning derived intent clusters will be selected for the given query input.

In example 12, the subject matter of any of examples 1-11 can optionally include training the machine-learning ranking model on a predetermined duration of search queries and user feedback; and periodically retraining the machine-learning ranking model with a rolling predetermined duration of search queries and user feedback.

Example 13 is a system for providing multi-level rich autosuggestions for multi-intent search queries. The system comprises one or more hardware processors and a memory storing instructions that, when executed by the one or more hardware processors, cause the one or more hardware processors to perform operations comprising receiving a query prefix entered in a search box of a search user interface; accessing a database of machine-learning derived intent clusters; based on the query prefix, identifying a top-ranking machine-learning derived intent cluster; updating the search user interface to provide a plurality of first level autosuggestions in an autosuggestion box including a smart suggestion, the smart suggestion being a first level suggestion of the top-ranking machine-learning derived intent cluster; receiving a selection of the smart suggestion; and in response to receiving the selection of the smart suggestion, replacing the plurality of first level autosuggestions in the autosuggestion box with second level autosuggestions, the second level autosuggestions comprising one or more intent categories that are subsets of the smart suggestion, each intent category comprising a plurality of subcategory suggestions corresponding to its intent category.

In example 14, the subject matter of example 13 can optionally include wherein the operations further comprise receiving a selection of a subcategory suggestion from one of the intent categories; and in response to the selection of the subcategory suggestion updating the search box with the selected subcategory suggestion; and replacing the second level autosuggestions with third level autosuggestions in the autosuggestion box, the third level autosuggestions comprising one or more third level intent categories that each represents a different category that is a subset of the selected subcategory suggestion.

In example 15, the subject matter of any of examples 13-14 can optionally include wherein the operations further comprise receiving a selection of a subcategory suggestion from one of the intent clusters; and in response to the selection of the subcategory suggestion performing a search based on the selected subcategory suggestion; and causing display of a result page based on the search.

In example 16, the subject matter of any of examples 13-15 can optionally include wherein the smart suggestion is displayed visually distinguished from regular suggestions of the plurality of suggestions in the autosuggestion box with a smart suggestion icon.

In example 17, the subject matter of any of examples 13-16 can optionally include wherein the operations further comprise generating the database of machine-learning derived intent clusters, the generating comprising accessing search logs of previous searches performed by users; and applying the search logs to a machine-learning clustering model that clusters similar search intents together for a given query input.

In example 18, the subject matter of any of examples 13-17 can optionally include wherein the operations further comprise ranking the machine-learning derived intent clusters, the ranking comprising applying the machine-learning derived intent clusters to a machine-learning ranking model that determines a probability that each machine-learning derived intent clusters will be selected for the given query input.

In example 19, the subject matter of any of examples 13-18 can optionally include wherein the operations further comprise training the machine-learning ranking model on a predetermined duration of search queries and user feedback; and periodically retraining the machine-learning ranking model with a rolling predetermined duration of search queries and user feedback.

Example 20 is a storage medium comprising instructions which, when executed by one or more hardware processors of a machine, cause the machine to perform operations for providing multi-level rich autosuggestions for multi-intent search queries. The operations comprise receiving a query prefix entered in a search box of a search user interface; accessing a database of machine-learning derived intent clusters; based on the query prefix, identifying a top-ranking machine-learning derived intent cluster; updating the search user interface to provide a plurality of first level autosuggestions in an autosuggestion box including a smart suggestion, the smart suggestion being a first level suggestion of the top-ranking machine-learning derived intent cluster; receiving a selection of the smart suggestion; and in response to receiving the selection of the smart suggestion, replacing the plurality of first level autosuggestions in the autosuggestion box with second level autosuggestions, the second level autosuggestions comprising one or more intent categories that are subsets of the smart suggestion, each intent category comprising a plurality of subcategory suggestions corresponding to its intent category.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining." "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving a query prefix entered in a search box of a search user interface;
    accessing a database of machine-learning derived intent clusters;
    based on the query prefix, identifying a top-ranking machine-learning derived intent cluster;
    updating the search user interface to provide a plurality of first level autosuggestions in an autosuggestion box including a smart suggestion, the smart suggestion being a first level suggestion of the top-ranking machine-learning derived intent cluster;
    receiving a selection of a first level autosuggestion from the plurality of first level autosuggestions;
    in response to receiving the selection of the first level autosuggestion, determining whether the selected first level autosuggestion is a regular suggestion that triggers return of a search result page or a smart suggestion that triggers display of second level autosuggestions;
    based on the selected first level autosuggestion being the smart suggestion, updating the search user interface by replacing the plurality of first level autosuggestions in the autosuggestion box with the second level autosuggestions, the second level autosuggestions comprising one or more intent categories that are subset categories of the smart suggestion, the display of at least some of the one or more intent categories in the autosuggestion box comprising a corresponding plurality of subcategory suggestions.

2. The method of claim 1, wherein at least some of the plurality of subcategory suggestions comprise a corresponding graphical element.

3. The method of claim 2, wherein the graphical element is an image corresponding to a subcategory suggestion of the plurality of subcategory suggestions.

4. The method of claim 2, wherein the graphical element is a video element corresponding to a subcategory suggestion of the plurality of subcategory suggestions, selection of the video element causing a corresponding video to play.

5. The method of claim 1, further comprising:
receiving a selection of a subcategory suggestion from one of the intent categories; and
in response to the selection of the subcategory suggestion:
updating the search box with the selected subcategory suggestion; and
replacing the second level autosuggestions with third level autosuggestions in the autosuggestion box, the third level autosuggestions comprising one or more third level intent categories that each represents a different category that is a subset of the selected subcategory suggestion.

6. The method of claim 1, further comprising:
receiving a selection of a subcategory suggestion from one of the intent clusters; and
in response to the selection of the subcategory suggestion:
performing a search based on the selected subcategory suggestion; and
causing display of a result page based on the search.

7. The method of claim 1, wherein the smart suggestion is displayed visually distinguished from regular suggestions of the plurality of suggestions in the autosuggestion box with a smart suggestion icon.

8. The method of claim 1, further comprising generating the database of machine-learning derived intent clusters, the generating comprising:
accessing search logs of previous searches performed by users; and
applying the search logs to a machine-learning clustering model that clusters similar search intents together for a given query input.

9. The method of claim 8, further comprising:
periodically updating the database of machine-learning derived intent clusters by accessing updated data from the search logs and applying updated data to the machine-learning model.

10. The method of claim 8, further comprising:
accessing suggestions generated by a language model, web documents, and knowledge data,
wherein the applying the search logs to the machine-learning clustering model further comprises applying the suggestions generated by the language model, the web documents, and the knowledge data to the machine-learning clustering model.

11. The method of claim 8, further comprising:
ranking the machine-learning derived intent clusters, the ranking comprising applying the machine-learning derived intent clusters to a machine-learning ranking model that determines a probability that each machine-learning derived intent clusters will be selected for the given query input.

12. The method of claim 11, further comprising:
training the machine-learning ranking model on a predetermined duration of search queries and user feedback; and
periodically retraining the machine-learning ranking model with a rolling predetermined duration of search queries and user feedback.

13. A system comprising:
one or more hardware processors; and
a memory storing instructions that, when executed by the one or more hardware processors, cause the one or more hardware processors to perform operations comprising:
receiving a query prefix entered in a search box of a search user interface;
accessing a database of machine-learning derived intent clusters;
based on the query prefix, identifying a top-ranking machine-learning derived intent cluster;
updating the search user interface to provide a plurality of first level autosuggestions in an autosuggestion box including a smart suggestion, the smart suggestion being a first level suggestion of the top-ranking machine-learning derived intent cluster;
receiving a selection of a first level autosuggestion from the plurality of first level autosuggestions;
in response to receiving the selection of the first level suggestion, determining whether the selected first level autosuggestion is a regular suggestion that triggers return of a search result page or a smart suggestion that triggers display of second level autosuggestions;
based on the selected first level autosuggestion being the smart suggestion, updating the search user interface by replacing the plurality of first level autosuggestions in the autosuggestion box with the second level autosuggestions, the second level autosuggestions comprising one or more intent categories that are subset categories of the smart suggestion, the display of at least some of the one or more intent categories in the autosuggestion box comprising a corresponding plurality of subcategory suggestions.

14. The system of claim 13, wherein the operations further comprise:
receiving a selection of a subcategory suggestion from one of the intent categories; and
in response to the selection of the subcategory suggestion:
updating the search box with the selected subcategory suggestion; and
replacing the second level autosuggestions with third level autosuggestions in the autosuggestion box, the third level autosuggestions comprising one or more third level intent categories that each represents a different category that is a subset of the selected subcategory suggestion.

15. The system of claim 13, wherein the operations further comprise:
receiving a selection of a subcategory suggestion from one of the intent clusters; and
in response to the selection of the subcategory suggestion:
performing a search based on the selected subcategory suggestion; and
causing display of a result page based on the search.

16. The system of claim 13, wherein the smart suggestion is displayed visually distinguished from regular suggestions of the plurality of suggestions in the autosuggestion box with a smart suggestion icon.

17. The system of claim 13, wherein the operations further comprise generating the database of machine-learning derived intent clusters, the generating comprising:
accessing search logs of previous searches performed by users; and
applying the search logs to a machine-learning clustering model that clusters similar search intents together for a given query input.

18. The system of claim 17, wherein the operations further comprise:
ranking the machine-learning derived intent clusters, the ranking comprising applying the machine-learning derived intent clusters to a machine-learning ranking model that determines a probability that each machine-learning derived intent clusters will be selected for the given query input.

19. The system of claim 18, wherein the operations further comprise:
training the machine-learning ranking model on a predetermined duration of search queries and user feedback; and
periodically retraining the machine-learning ranking model with a rolling predetermined duration of search queries and user feedback.

20. A storage medium comprising instructions which, when executed by one or more hardware processors of a machine, cause the machine to perform operations comprising:
receiving a query prefix entered in a search box of a search user interface;
accessing a database of machine-learning derived intent clusters;
based on the query prefix, identifying a top-ranking machine-learning derived intent cluster;
updating the search user interface to provide a plurality of first level autosuggestions in an autosuggestion box including a smart suggestion, the smart suggestion being a first level suggestion of the top-ranking machine-learning derived intent cluster;
receiving a selection of a first level autosuggestion from the plurality of first level autosuggestions;
in response to receiving the selection of the first level autosuggestion, determining whether the selected first level autosuggestion is a regular suggestion that triggers return of a search result page or a smart suggestion that triggers display of second level autosuggestions;
based on the selected first level autosuggestion being the smart suggestion, updating the search user interface by replacing the plurality of first level autosuggestions in the autosuggestion box with the second level autosuggestions, the second level autosuggestions comprising one or more intent categories that are subset categories of the smart suggestion, the display of at least some of the one or more intent categories in the autosuggestion box comprising a corresponding plurality of subcategory suggestions.

* * * * *